US006255651B1

(12) United States Patent
Laluvein et al.

(10) Patent No.: US 6,255,651 B1
(45) Date of Patent: Jul. 3, 2001

(54) DETECTOR

(75) Inventors: Bernard Etienne Henri Laluvein, Eastcote; Paul Basham, High Wycombe, both of (GB)

(73) Assignee: Thorn Security Limited, Middlesex (GB)

( * ) Notice: Subject to any disclaimer, the term of this patent is extended or adjusted under 35 U.S.C. 154(b) by 0 days.

(21) Appl. No.: 09/272,377

(22) Filed: Mar. 19, 1999

(51) Int. Cl.$^{7}$ .......... G01J 5/10
(52) U.S. Cl. .......... 250/339.15; 340/578
(58) Field of Search .......... 250/339.15, 339.14, 250/226; 340/577, 578

(56) References Cited

FOREIGN PATENT DOCUMENTS 0 064 811 11/1982 (EP) .

*Primary Examiner*—F. L. Evans
(74) *Attorney, Agent, or Firm*—Evenson, McKeown, Edwards & Lenahan, P.L.L.C.

(57) ABSTRACT

There is described a detector which is suitable for use as a fire detector. The detector has two channels which allow for discrimination between energy received from a fire and a "false fire". False fires are sometimes detected as a result of radiation from a so called "cold", black body radiation source which flickers at a frequency of between 1 and 20 Hz. In the past, these gave rise to false alarms being triggered. The invention overcomes the problem by having a notch filter which when used in combination with another filter, ensures that detected radiation at, or around, 4.3 $\mu$m is transmitted to a sensor. A processor then compares the received value with a value computed by interpolating between signals received from two other channels. If a threshold value is exceeded an alarm is triggered. The invention thus overcomes disadvantages with prior art systems as signals from cold black body sources are rejected as false.

13 Claims, 6 Drawing Sheets

Fig. 1.
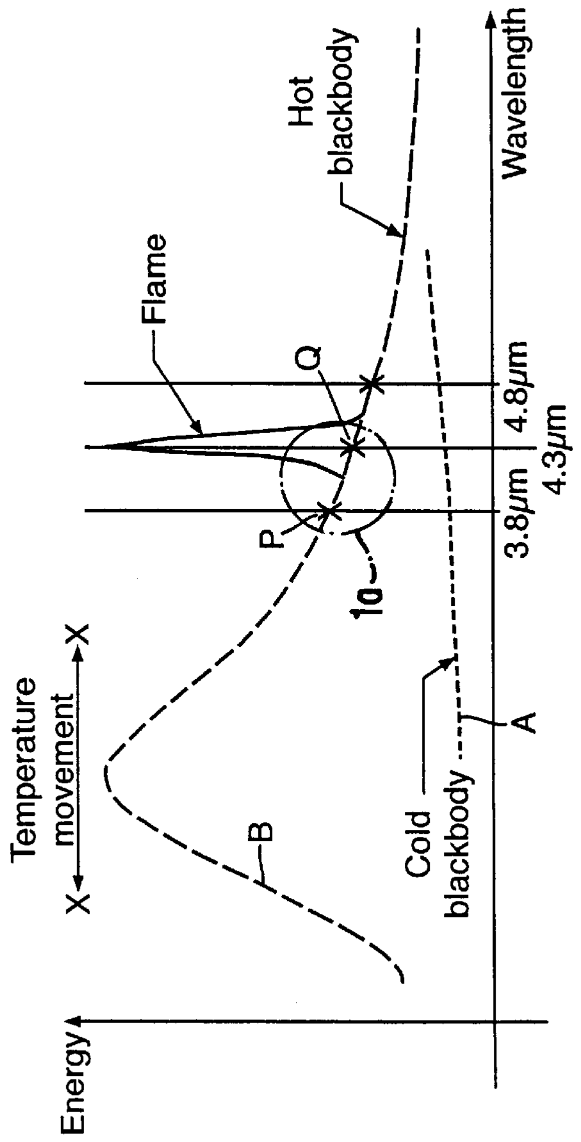
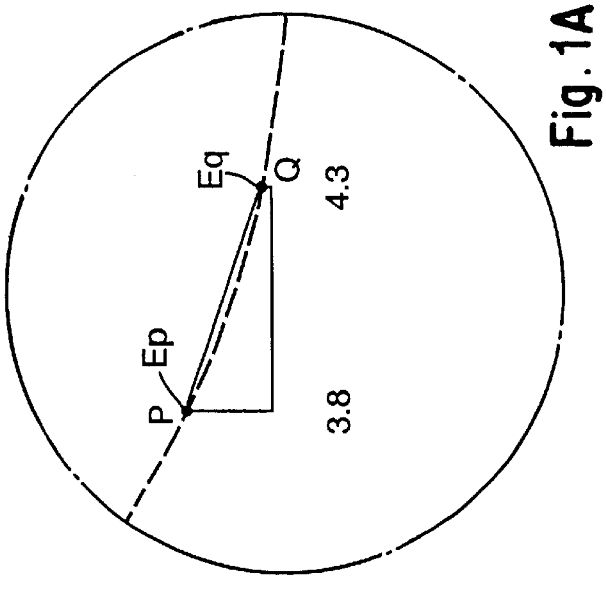
Fig. 1A

Area M approximately equal to area N

DETECTOR

FIELD OF THE INVENTION

This invention relates to a detector, and more particularly, but not exclusively, to a detector which is suitable for use as a fire detector.

DESCRIPTION OF THE PRIOR ART

One type of fire detector is a flame detector and is described in the Applicant's granted European Patent EP-B-0 064 811. The fire detector described in the aforementioned Patent was extremely successful. However, there was a risk that a false alarm might be given. The reason for this is described briefly below with reference to FIG. 1.

The fire detector described in the aforementioned granted Patent comprised two sensors. Each sensor provided a signal, one indicative of energy at or around 4.3 μm the other at an energy of around 3.8 μm. Energy detected at 4.3 μm indicated that $CO_2$ was present. Energy detected at 3.8 μm was used as a reference signal. A signal, indicative of the presence of a fire occurred if a first signal exceeded both a variable threshold and a fixed threshold. In this way the detector ensured that an alarm was triggered as a result of a valid signal (arising from a fire) rather than from one arising due to background noise.

When the detected value of a valid signal (which exceeded the threshold), was compared with a reference value, a quotient was obtained. The quotient always exceeded a non-zero value.

This quotient was used to remove or reduce background noise. Other methods of reducing background noise were also possible, for example direct comparison of the detected and threshold values or comparison of their respective differences with a reference value.

Occasionally however false alarms occurred. Usually false alarms were due to a signal processor error. The processor was arranged to vary the threshold of the reference sensor, i.e., the sensor which detected radiation energy at 3.8 μm. This ensured that the threshold for triggering an alarm was increased with increasing similarity and decreased with decreasing similarity in the event of an increase/decrease in background noise. Thus, the greater the similarity between the variations with time of the output signals of each sensor, the greater the quotient and the higher the threshold to which an alarm trigger value was automatically shifted. This was found to assist the detector in discriminating between blackbody radiation which varied at a flame flicker frequency, (typically around 1 to 20 Hz).

FIG. 1 shows diagramatically a graph of blackbody radiation energy against wavelength. A radiation peak, centered around 4.3 μm occurs as a result of Carbon Dioxide ($CO_2$) emission. In the detector described above, energy from the $CO_2$ peak was detected and when the detected value exceeded a predetermined threshold, an alarm was triggered. The threshold was variable and could be set prior to a fire detector being installed. Thus the detector could be configured to detect a small fire at a distance of, for example 5 m, or a larger fire at a distance of, for example 25 m.

However, the aforementioned detector was occasionally prone to false alarms. These occurred not as a result of threshold detection problems but rather as a corollary of the logic circuitry and software which determined so called blackbody rejection characteristics. Referring again briefly to FIG. 1, the dotted line A, below the main blackbody radiation curve B, depicts radiation from a "cold" blackbody. Because curve A represents a "cold" blackbody, whose peak energy emission is less than that of a flame, the peak of curve A is at a longer wavelength than that of curve B. Curve B is derived from a relatively hot blackbody such as a process heater, gas turbine or a boiler at which the detector was usually pointed. Typically radiation depicted by curve A may be from a relatively cool object such as a human body or part of a body which is exposed to the detector. When this occurred, the gradient of curve A, at or around 4.3 μm, was positive. It can be seen from curve B that its gradient was always negative at, or around, 4.3 μm. It has been found that this has been the reason for the problem which occasionally caused a false alarm. The detector effectively sensed activity at or around 4.3 μm and from knowledge of what was occurring at, or around, the 3.8 μm waveband, a processor calculated a threshold value. This threshold value was effectively used as part of a checking function which involved a cross-correlation algorithm.

Because the expected value of the intersect of the curve of radiation detected at 3.8 μm and blackbody radiation curve B (illustrated by point P on FIG. 1) was always higher than the value detected at the 4.3 μm (illustrated by point Q on FIG. 1) the cross-correlation function effectively "assumed" the function had a constant negative gradient. Interpolation between points P and Q was therefore always performed by the function according to a linear function (y=mx+c), where m=2 (Ep-Eq) and $E_p$ is the detected energy at point P (at 3.8 μm) and Eq is the energy detected at point Q (at 4.3 μm). Spurious signals detected from a random "cold" blackbody source, such as a hand waving or a person moving in front of the detector at a critical distance sometimes gave rise to false alarms if the motion was detected within a "flame flicker frequency" (typically 1 to 20 Hz). In these instances it was falsely predicted that such radiation exceeded the alarm threshold and an alarm was triggered.

It is an object of the present invention to provide a solution to the aforementioned problem.

SUMMARY OF THE INVENTION

According to the present invention there is provided a detector comprising: a first sensor arranged to provide signals indicative of incident radiation at two different wavebands, and at least a second sensor arranged to detect radiation at a third waveband; means for processing signals derived from the first sensor, so as to obtain an expected value of radiation incident on the second sensor; means for comparing the expected value with the actual value incident on the second sensor and means to trigger an alarm in the event of a preset threshold being exceeded by the detected value.

Thus the problem with prior art detectors is overcome by providing an independent detector for comparing actual radiation with expected radiation.

Preferably separate channels are provided with the first sensor, a first channel being able to detect radiation at a first wavelength, typically at or around 3.8 μm and a second wavelength, typically at or around 4.8 μm. By arranging the first sensor to detect at these wavelengths a prediction of energy centered around 4.3 μm, is able to be obtained. Thus a relatively broad band of energy sensed by the first sensor ensures that blackbody rejection characteristics across all wavelengths are very good. The channel detected by the sensor is hereinafter referred to as a guard channel.

A second sensor, detects radiation at 4.3 μm, and provides what is hereinafter referred to as a flame channel signal.

Means may be provided to detect the amount of energy between 3.8 μm and 4.8 μm and approximate this to a linear function. However, any suitable measurement of the energy at these two wavelengths provides sufficient information to interpolate the amount of blackbody radiation at an intermediate wavelength of around 4.3 μm. Detected energy from the emission from carbon dioxide may be superimposed onto energy received from any blackbody, in the detector field of view. Thus proper segregation between "non-flame" signals and flame signals is achieved.

A guard channel may provide a signal for cross correlation with the flame channel. The cross correlation signal provides an accurate prediction of the non-flame energy present in the flame detection waveband. The prediction of the amount of non flame energy is independent of the temperature of the radiation source and allows the detector to provide effective blackbody rejection over a wide range of source temperatures.

Most preferably the guard channel includes an optical element which may be an optical filter or filters arranged in series. Preferably these optical filters are in the form of discs and are placed one on another. The optical filters when configured in a parallel arrangement are adapted to perform an optical filtering function on incident radiation across the waveband extending from and including 3.8 μm to 4.8 μm.

Preferably first and second optical filters are used to provide signals indicative of radiation sensed at the two different wavebands. Each optical filter has different radiation transmission characteristics and each is disposed, in use, between the first sensor and a source of radiation.

Preferably the first filter is an interference filter which provides a notch filter function. The first filter transmits radiation, in a narrow band, typically around 3.8 μm as well as radiation in a waveband extending from 4.8 μm. It is important to note that the notch filter is arranged not to transmit radiation at or around the 4.3 μm waveband.

Preferably the second optical filter includes a sapphire ($Al_2O_3$) filter. The sapphire filter when combined with the guard channel provides a combination filter. This permits rapid, direct processing of optical signals in two different wavebands.

Use of optical filters rather than separate electronic sensors, improves the overall reliability and ruggedness of the detector because the number of components is reduced. Also the need for complex calibration procedures is not required.

The detector may be of the type found in existing fire detectors. If this arrangement is used then retrofitting of relevant hardware components and/or down loading of relevant software control algorithms to existing fire detectors is facilitated.

The invention offers a significant increase in sensitivity to flame detection as removal of noise in the system is achieved by obtaining a more precise estimate of the background radiation at the flame channel. This increase in sensitivity is made possible by more precisely predicting non-flame energy in the flame detection waveband and enables discrimination between a signal from a smaller flame. Advantageous by the invention includes three field selectable range settings. The ranges: for example include 50 m, 25 m and 12.5 m respectively.

In a preferred embodiment of the invention means is provided for detecting and displaying other conditions. For example, different colour light emitting diodes (LEDs) may be provided to flash at different rates and provide separate indication of alarm detector (electronic) fault and/or 'dirty' window indication (optical integrity monitoring).

An analogue output current, in the range 4 to 20 mA, proportional to the flame detection signal is preferably supplied. Pre-set analogue currents, in the range 0 to 4 mA are used to supply the signal detector (electronic) fault and 'dirty' window fault indication.

BRIEF DESCRIPTION OF THE DRAWINGS

A preferred embodiment of the invention will now be described, by way of example only, and with reference to FIGS. 2 to 5 in which:

FIG. 1 is an exagerated graph (not to scale) showing energy against wavelength and depicts diagramatically, separate curves for hot and cold blackbodies;

DETAILED DESCRIPTION OF AN EMBODIMENT

Referring to FIGS. 2 to 5 and more particularly to FIG. 3, there is shown a fire detector 10 having an optical window 12 formed from a sapphire ($Al_2O_3$) material. A flame detector 14 and a guard channel 16 are supported within the housing of detector 10.

The sensitivity of detector 10 is not affected to any great extent, by the presence of "cold blackbody" radiation in the same field of view as a flame (not shown). The ability of detector 10 to determine accurately the amount of non-flame radiation received at any one time by a flame detection channel allows a variable alarm threshold to be determined as shown diagramatically in FIG. 2. This threshold is calculated so that the sensitivity of the detector remains largely unchanged in the presence of blackbody sources at different temperatures and intensities.

Figure 3A:
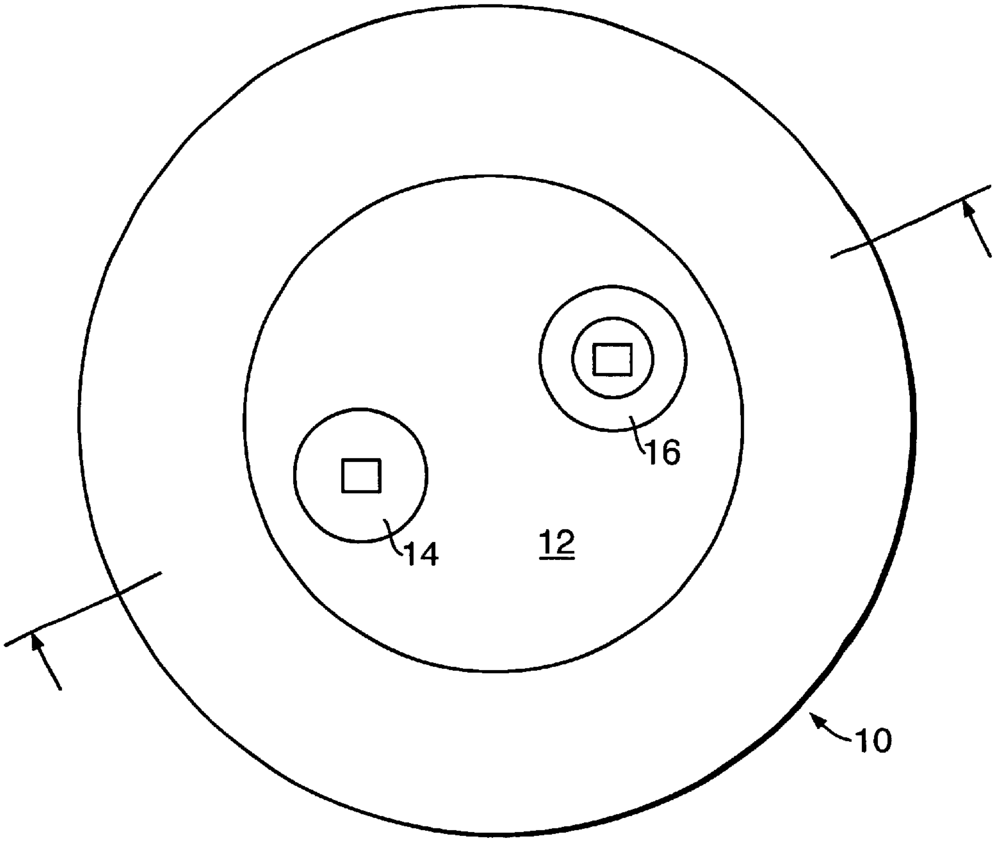
FIG. 3 is an overall, diagrammactical plan view (FIG. 3A) and sectional view (FIG. 3B) of a flame detector showing a guard detector, flame detector and a protective window.

FIG. 3A is a plan view of a detector 10. A first sensor 16 acts as a guard channel and a second sensor 14 acts as a flame channel. The sensors 14 and 16 are supported within the detector 10. A saphire window 12 encloses the two sensors 14 and 16.

Figure 3B:
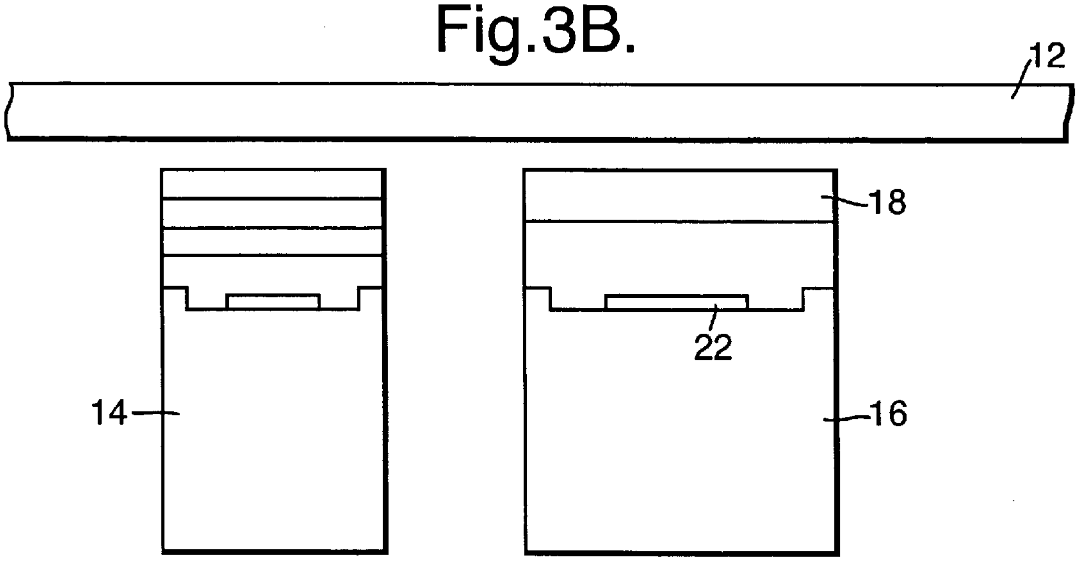

FIG. 3B shows a cross-sectional view through detector 10. A first optical filter 18 is placed on an upper portion of the guard channel 16. The sensor and filter are located beneath a sapphire filter 12. Radiation sensor 22 is supported within the housing of guard channel 16 and supplies signals indicative of those received by the guard channel 16. Radiation incident on the sensor 22 causes a voltage potential to be established. An optical frequency response characteristic of the first optical filter 18 is shown in the upper of the two sketches in FIG. 4A. The frequency response characteristics of the sapphire filter 12 is shown in the lower sketch in FIG. 4A.

Figure 2:
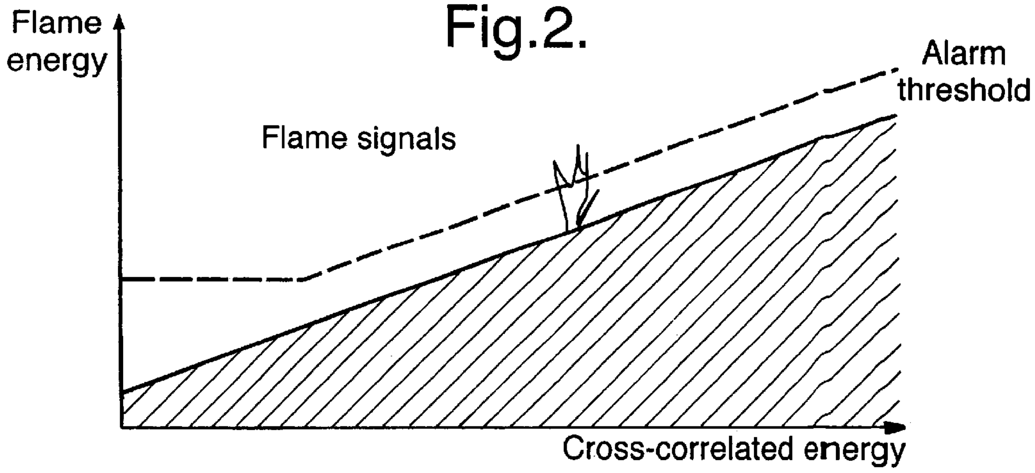
FIG. 2 is a graph showing diagramatically detected energy from a flame, cross correlated with that detected by a guard channel and illustrates the varying level of alarm threshold.
Figure 4A:
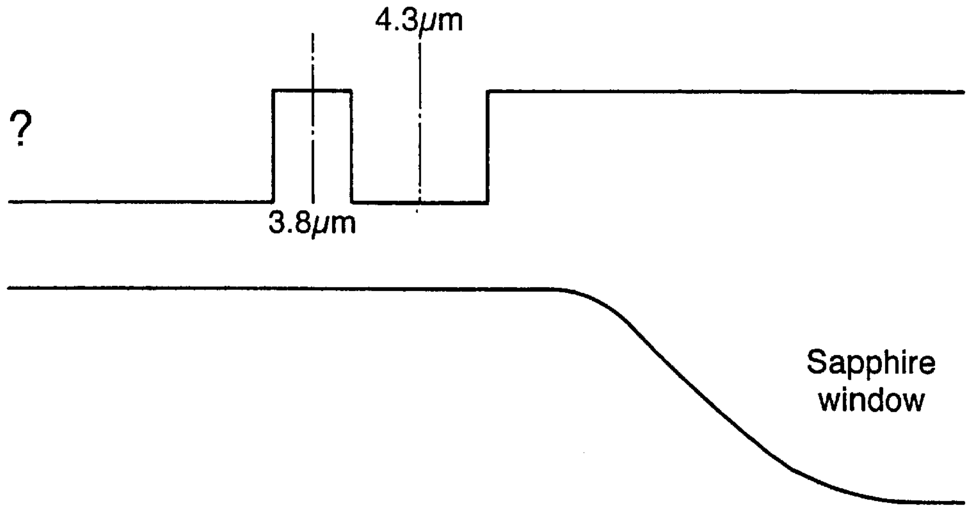
FIG. 4A shows two graphs representative of notch filter functions and transmission characteristics of a Sapphire window.
Figure 4B:
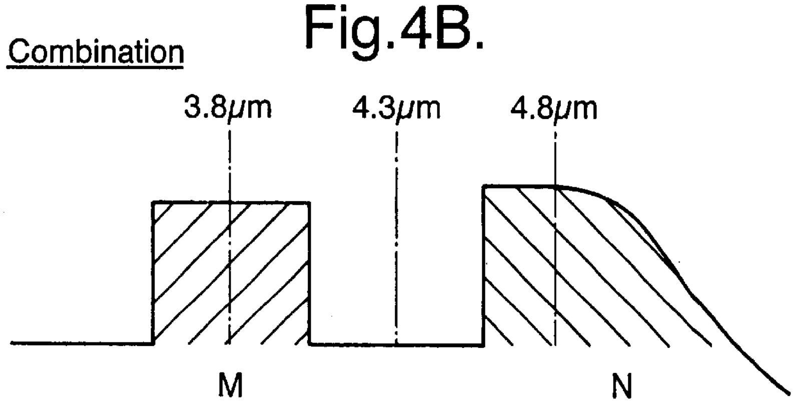
FIG. 4B shows a graph of a combined optical filter function.
Figure 5A:
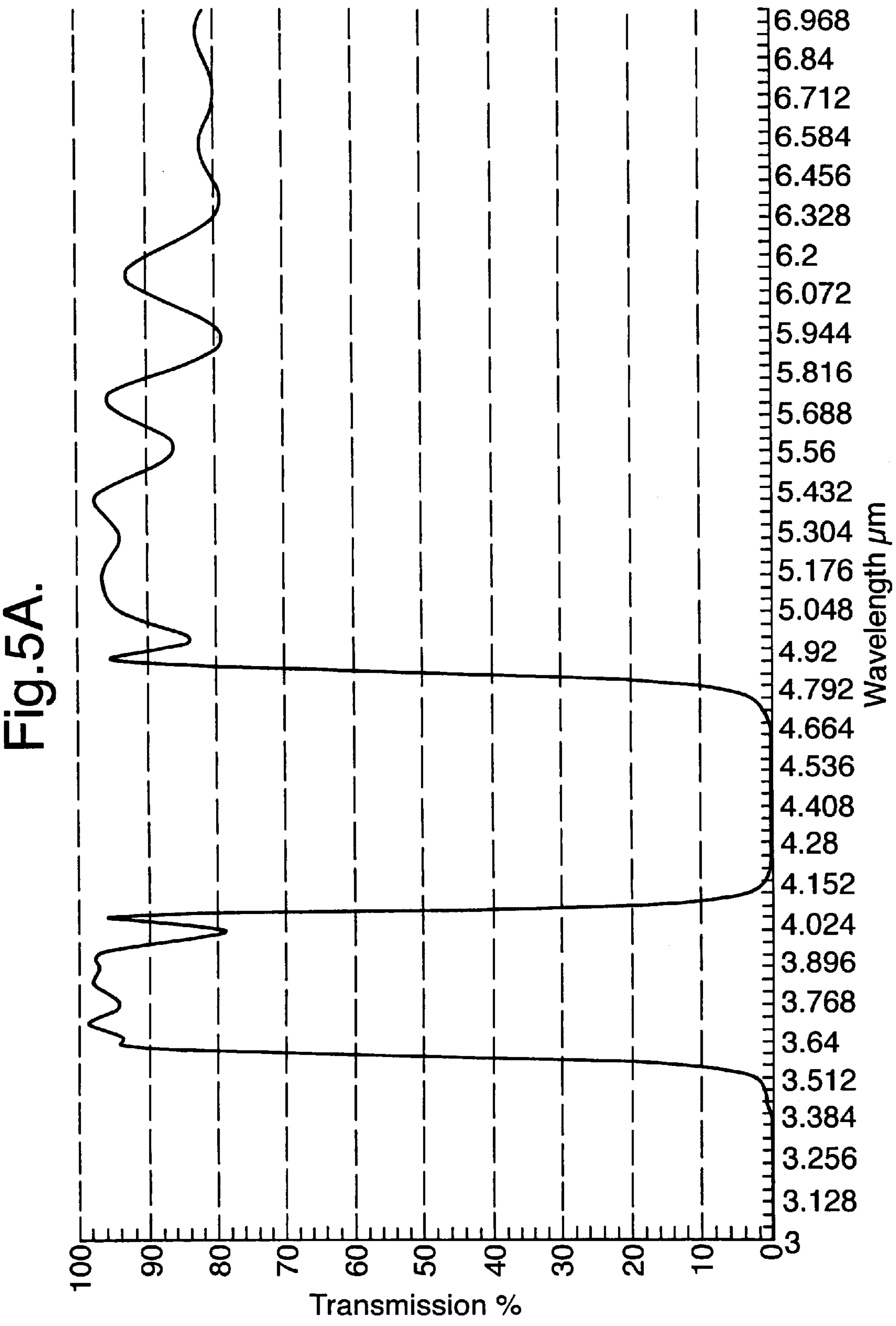
FIG. 5 shows actual graphs of the notch filter functions (FIG. 5A) and a combined optical filter function showing the transmission characteristics of a Sapphire window (FIG. 5B).
Figure 5B:
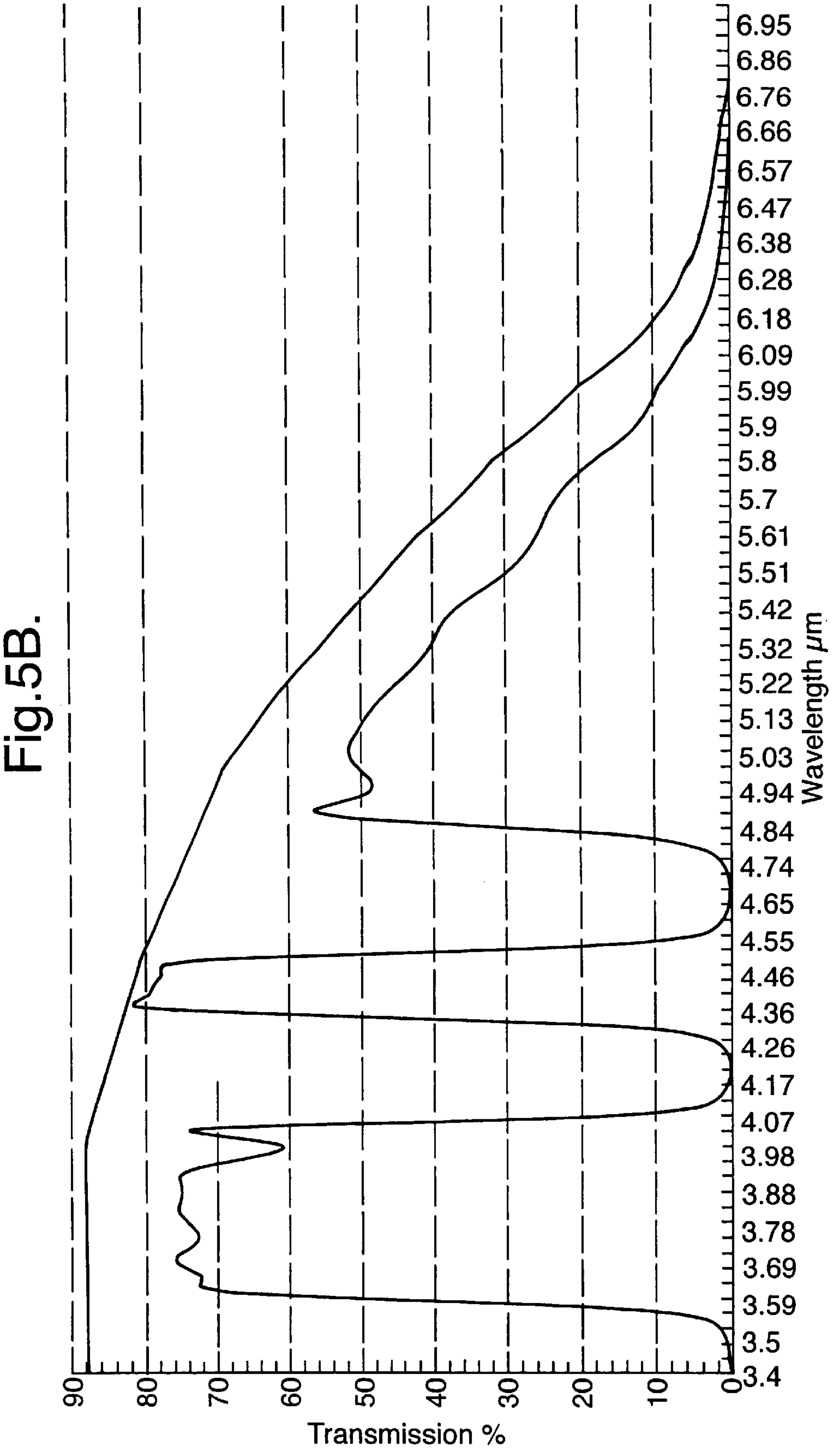
Figure 6:
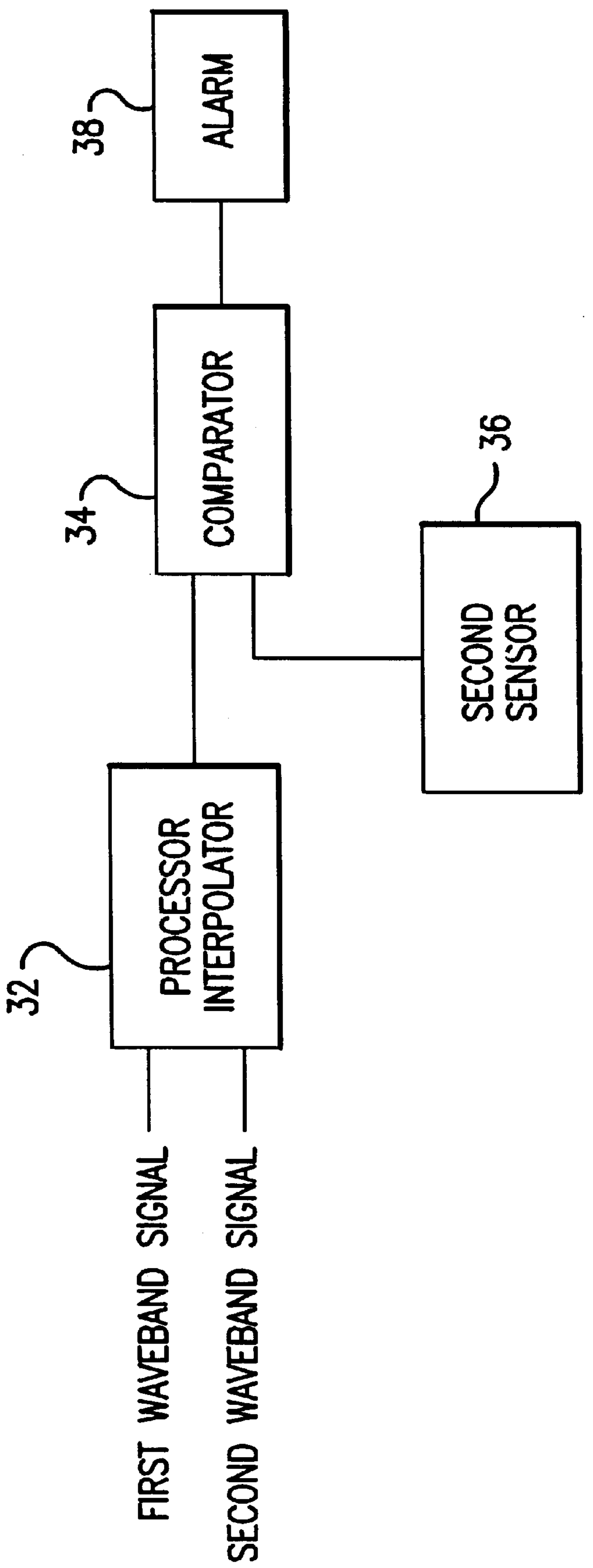
FIG. 6 is a block diagram of signal processing from the first and second sensors to provide alarm triggering.

FIGS. 4 and 5 show the separate and combined effect of the optical filters 18 and 12. The practical combined effect is to provide a notch filter function, which is the effective equivalent of the optical filters 18 and 12. FIG. 4B shows a sketch of two distinct bandpass curves M and N. The areas under each of the curves M and N are approximately equal. The combined effect of the filtering function is to provide a signal at the guard channel representative of two different wavebands. The first waveband is centered around 3.8 μm, the second is centered around 4.8 μm. As shown in FIG. 6, linear interpolation between values obtained at these two wavelengths is then performed under control of a microprocessor 32, as described for example in the Applicant's granted European Patent EP-B-0 064 811. This provides that the interpolated output of the processor 32 is fed along with the output of the second sensor 36 to the comparator 34. If the expected value from the interpolator 32 exceeds the actual value from the second sensor 36 by predetermined amount, that the alarm 38 will be triggered.

Because linear interpolation is performed between the two values, a true value for the gradient (i.e. positive or negative) of the hot blackbody is obtained. There is therefore no risk of a negative gradient being obtained instead of a positive one, or vice versa. Consequently there is no risk of a false alarm occuring when a relatively cold black body radiates at the detector. Processing of signals is performed in a similar manner to that described in GB-B-2281615. The same (or similar) hardware is used. However, as optical signals may be of a different energy level a different scale factor may be required.

The invention has been described by way of example only and variation to the embodiment described may be made without departing from the scope of the invention.

What is claimed is:

1. A detector comprising a first sensor arranged to provide signals indicative of incident radiation at first and second wavebands, a second sensor arranged to detect radiation at a third waveband, means for processing signals derived from the first sensor, so as to obtain an expected value of radiation incident on the second sensor, means for comparing the expected value with an actual value of radiation incident on the second sensor, and means to trigger an alarm in the event of a pre-set threshold being exceeded by the actual value.

2. A detector according to claim 1, wherein the first sensor is arranged such that the first waveband is substantially 3.8 μm and the second waveband is substantially 4.8 μm.

3. A detector according to claim 2, wherein the second sensor is arranged to detect radiation at substantially 4.3 μm.

4. A detector according to claim 3, wherein means is provided in order to interpolate a value for radiation at or around 4.3 μm.

5. A detector according to claim 1, said second sensor comprising means for detecting energy from carbon dioxide ($CO_2$) emission and means for converting detected energy into a signal having said actual value and said detector further including means for superimposing said signal onto said expected value.

6. A detector according to claim 1, wherein the first sensor is provided with an optical element.

7. A detector according to claim 6, wherein the optical element comprises a plurality of optical filters.

8. A detector according to claim 7, wherein one of said filters is an interference filter for transmitting radiation in a narrow band.

9. A detector according to claim 8, wherein another of said filters is a sapphire filter, so that the optical elements acts as a combination filter.

10. A detector according to claim 9, wherein the combination filter is a notch filter.

11. A detector according to claim 10, wherein the notch filter transmits radiation in the first and second wavebands.

12. A detector according to claim 11, wherein the notch filter filters out radiation in the third waveband.

13. A detector according to claim 1, wherein means is provided in order to interpolate a value for radiation at or around 4.3 μm.

* * * * *